US012452372B2

(12) United States Patent
Zhang et al.

(10) Patent No.: US 12,452,372 B2
(45) Date of Patent: Oct. 21, 2025

(54) ENHANCED INTERACTIVE VOICE RESPONSE SYSTEM PROVIDING BI-COMMUNICATION PATHWAYS FOR CALL SUPPORT AND ROUTING

(71) Applicant: Bank of America Corporation, Charlotte, NC (US)

(72) Inventors: Xianhong Zhang, Issaquah, WA (US); Sridevi Rachakulla, Charlotte, NC (US); Ramakrishna Yannam, The Colony, TX (US); Tao Huang, Bellevue, WA (US); Manoj Shankar, Bothell, WA (US)

(73) Assignee: Bank of America Corporation, Charlotte, NC (US)

( * ) Notice: Subject to any disclaimer, the term of this patent is extended or adjusted under 35 U.S.C. 154(b) by 176 days.

(21) Appl. No.: 18/413,336

(22) Filed: Jan. 16, 2024

(65) Prior Publication Data
US 2025/0233943 A1   Jul. 17, 2025

(51) Int. Cl.
*H04M 3/523* (2006.01)
*H04M 3/42* (2006.01)

(52) U.S. Cl.
CPC ..... *H04M 3/5235* (2013.01); *H04M 3/42068* (2013.01); *H04M 2203/256* (2013.01); *H04M 2203/6045* (2013.01)

(58) Field of Classification Search
CPC .......... H04M 3/5235; H04M 3/42068; H04M 2203/256; H04M 2203/6045
USPC .... 379/265.02, 242, 265.01, 265.05, 265.11, 379/142.05, 221.01
See application file for complete search history.

(56) References Cited

U.S. PATENT DOCUMENTS 8,054,951 B1 * 11/2011 Winslow ................ G06Q 30/06
704/251
9,319,522 B1 * 4/2016 Webster .................. H04W 4/14

* cited by examiner

*Primary Examiner* — Thjuan K Addy
(74) *Attorney, Agent, or Firm* — Weiss & Arons LLP (57) ABSTRACT

A telephonic routing system to enable rerouting a call between a live agent and an automated agent. The system may include a receiver configured to receive a telephonic call from a caller. The system may also include a router configured to route the telephonic call to a first communication pathway where the first communication pathway may connect the telephonic call to a live agent headset device. The system may also include a processor configured to retrieve a customer profile associated with a phone number of the telephonic call and display authentication data, on a graphical user interface ("GUI") of a computing device associated with the live agent headset device. The router may be further configured to reroute the telephonic call to a second communication pathway for verifying an authenticity of the caller. The second communication pathway may establish a connection between the telephonic call and the automated agent.

20 Claims, 5 Drawing Sheets

ENHANCED INTERACTIVE VOICE RESPONSE SYSTEM PROVIDING BI-COMMUNICATION PATHWAYS FOR CALL SUPPORT AND ROUTING

FIELD OF TECHNOLOGY

Aspects of the disclosure relate to customer authentication in interactive voice response systems.

BACKGROUND OF THE DISCLOSURE

Call centers typically include numerous agents actively responding to customer questions and requests. When an agent receives a call from a customer, the agent needs to identify and authenticate the customer prior to providing customer assistance.

Customer authentication by a live agent includes the live agent being provided with private customer information. This may include the customer's social security number, bank account number, credit card number, transaction data, etc. This may compromise the customer's feelings of security. Additionally, manually inputting information received from the customer may lead to inaccuracy because of typing errors or miscommunication. Such errors may increase the duration of the call, leading to a longer queue of calls waiting to be answered.

It would be desirable, therefore, to have systems and methods for automatically routing a call from a live agent to an automated agent for performing customer authentication.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A telephonic routing system to enable rerouting a call between a live agent and an automated agent is provided. The telephonic routing system may be running on a communications server associated with an entity of the system.

The telephonic routing system may include a receiver configured to receive a telephonic call from a caller. The telephonic call may be a call received via a mobile device associated with the caller. The caller may be a customer of the entity. The caller may be a potential customer.

Following a receipt of the telephonic call, the receiver may be further configured to extract a phone number associated with the telephonic call. The phone number extracted may assist in the retrieval of identification information associated with the caller.

The telephonic routing system may also include a router. The router may be configured to route the telephonic call to a first communication pathway. The first communication pathway may connect the telephonic call to a live agent headset device. The live agent headset device may be a wearable computing device being used by a live agent employed by the entity.

The telephonic routing system may include a processor. The processor may be configured to retrieve a customer profile associated with the phone number. The customer profile may include user identification data, private data associated with a customer account and authentication data for authenticating the caller as being associated with the customer profile.

The processor may be configured to display authentication data on a graphical user interface ("GUI") of a computing device associated with the live agent headset device. The GUI may be within a field of view of the agent wearing the live agent headset device. The authentication data may include the customer profile. The authentication data may also include input fields for receiving authentication information.

Authentication information may include one or more responses to generated authentication questions. The generated authentication questions may be security questions transmitted to the caller for authentication of the caller. The security questions may be associated with a date of birth, social security number, account number, passwords(s) and any other suitable security question.

The input fields may be filled automatically via the automated agent. This may enhance the accuracy of the responses received via the IVR system. When a live agent inputs the response, there may be typing errors. There may be one or more miscommunications when typing a response heard by the live agent. Such errors may increase the duration of the call, cause authentication or other errors.

Following a displaying of the authentication data to the live agent headset device, the router may be further configured to reroute the telephonic call from the first communication pathway to a second communication pathway. The rerouting may be for verifying an authenticity of the caller.

The second communication pathway may establish a connection between the telephonic call and an automated agent. The connection between the telephonic call and the automated agent may be an automated call without intervention from the live agent headset device.

In some embodiments, the second communication pathway may be solely between the caller and the automated agent. In some embodiments, the second communication pathway may be between the caller and the automated agent with a possibility of intervention, when determined to be necessary, from the live agent headset device.

The processor may be further configured to verify the authenticity of the caller, via the automated agent.

The verification via the processor may include outputting an authentication question on the second communication pathway. Following the outputting, the verification may include receiving a voice response to the authentication question.

The verification via the processor may further include performing a first authentication step. The first authentication step may include verifying that a similarity between the voice response and a pre-recorded voice signature stored in the customer profile is greater than a pre-determined threshold level.

The pre-recorded voice signature may be a recording of a voice of the customer associated with the customer profile.

The pre-recorded voice signature may be recorded at a time of initiation of the customer account and profile.

It will be appreciated that the pre-determined threshold level of similarity may be a close to perfect match between the voice response and the pre-recorded voice signature. The pre-determined threshold level may be set to a minimum of 95%, 97%, 99% or any other suitable percentage. In some embodiments, the pre-determined threshold level of similarity may be a near-perfect match of 99.9%.

When the similarity is less than the pre-determined threshold level, the processor may be configured to deny the authenticity of the caller. In some embodiments, the telephonic call may automatically be terminated following the denying. In some embodiments, the telephonic call may be rerouted to the first communication pathway for further assistance and the customer profile may be, at least temporarily, placed in an inactive state. The inactive state may be a state where the live agent headset device may not accept another call but may interact with the GUI.

When a determination that the similarity is greater than the pre-determined threshold level is determined, the processor may be further configured to perform a second authentication step. The second authentication step may include authenticating the response itself. The processor may be configured to convert the voice response to text. The converting may be performed via voice recognition software and machine learning ("ML") algorithms in order to match the appropriate text from the voice response. The converting may be performed using natural language processing ("NLP") algorithms to extract a most accurate wording from the voice of the caller.

The processor may be further configured to confirm whether the text matches data stored in the customer profile. The text may include an answer to the security question. The text may include private data. The text may correlate to a social security number, password or any other suitable response.

It will be appreciated that the second communication pathway may be a secure electronic communication pathway for receiving and transmitting private and sensitive data.

In response to confirming, the processor may be configured to update an authentication status displayed on the GUI.

While the call is in progress via the second communication pathway, the processor may be further configured to place the live agent headset device on hold. When the call is placed on hold and the call is rerouted to the second communication pathway, a second call may not be received by the live agent headset device.

In addition, while the call is in communication with the second communication pathways, the processor may be configured to update the GUI, in real time, to include information received by the automated agent.

The updating may include displaying the authentication question on the GUI. The updating may further include determining an input field that is associated with the authentication question. The updating may further include displaying the text response within the input field determined to be associated with the authentication question. The text response may be displayed as obscured text.

In addition to displaying the text response, the processor may be configured to display the authentication status of the input field. This may be displayed as a 'pass' or 'fail.'

The processor may also be configured to trigger a display of a window within the GUI. The window may be configured for receiving one or more requests, in real-time, from the live agent headset device. The one or more requests may be for requesting additional authentication from the caller. The live agent may be enabled to trigger the automated agent, via the window, to request additional authentication from the caller. The live agent may be enabled to trigger the automated agent to verify one or more text responses that may be questionable.

The GUI may be also configured for displaying information identified from the call, via artificial intelligence ("AI") as being pertinent to one or more services the call may be associated with. The information may include data and/or hyperlinks that may be readily accessible via the live agent headset device to provide to the caller when the call is rerouted to the first communication pathway.

In response to a verifying of the authenticity of the caller, the router may be further configured to reroute the call to the first communication pathway.

When the caller is not verified following a first authentication question, the automated agent may be triggered to transmit a second, third or more authentication questions to the caller. The system may be configured to limit the amount of authentication questions the caller may be allocated. Following a passing of the limit, the caller may be terminated, at least temporarily, from accessing the account, customer profile and/or performance of transactions associated with the account.

The system may be configured to periodically prompt customers to change the pre-recorded voice signature. The periodically triggering may include, following a lapse of a pre-determined time period, triggering a request to be transmitted to the customer for updating the pre-recorded voice signature.

A method for automatically rerouting telephonic calls between a live agent and an automated agent is provided. The method may include receiving a telephonic call from a caller. The method may further include routing the telephonic call to a first communication pathway. The first communication pathway may connect the telephonic call to a live agent headset device.

The method may further include retrieving a customer profile associated with a phone number of the telephonic call. Following retrieving of the customer profile, the method may include displaying authentication data, on a GUI of a computing device associated with the live agent headset device.

The authentication data may include the customer profile. The authentication data may also include input fields for receiving authentication information.

The method may further include rerouting the telephonic call from the first communication pathway to a second communication pathway for verifying an authenticity of the caller. The second communication pathway may establish a connection between the telephonic call and an automated agent.

The method may further include verifying the authenticity of the caller by via the automated agent by outputting an authentication question on the second communication pathway. The method may further include receiving a voice response to the authentication question.

Following a receipt of the voice response the method may include performing a first authentication step. The first authentication step may include verifying that a similarity between the voice response and a pre-recorded voice signature stored in the customer profile is greater than a pre-determined threshold level.

The method may further include, following a determination that the similarity is greater than the pre-determined threshold level, performing a second authentication step. The second authentication step may include converting the voice response to text. Following the converting, the method may include confirming whether the text matches profile data stored in the customer profile.

When the text does not match the profile data, the method may include rerouting the telephonic call to the first communication pathway. The telephonic call may be rerouted to the first communication pathway to perform an additional mode of authentication leveraging a mobile device of the caller.

The method may include transmitting a one-time passcode ("OTP") to a mobile device of the caller. The OTP may be generated via the communications server of the IVR system and may be transmitted to the mobile device. The OTP may be retrieved via an email, text message or any suitable electronic communication.

The OTP may then be inputted via the keypad of the mobile device. The OTP may be inputted via voice of the caller.

The method may further include receiving input, in the live agent headset computing device, of the OTP.

In response to an authentication of the OTP by the live agent headset computing device, the method may include rerouting the call to the second communication pathway.

The method may further include, following the rerouting, outputting a second authentication question at the second communication pathway.

The method may further include receiving a second voice response to the second authentication question. In response to confirming, the method may include updating an authentication status displayed on the GUI.

While the telephonic call is in communication with the second communication pathway the method may include placing the live agent headset device on hold such that a second call is not received by the live agent headset device while the call is rerouted to the second communication pathway.

The method may further include updating the GUI, in real time, to include information received by the automated agent. The updating may include determining an input field that is associated with the authentication question. The updating may further include displaying the text response within the input field determined to be associated with the authentication question. It should be appreciated that the text may be displayed as obscured text.

The method may further include displaying the authentication status of the input field. The method may further include, following the verifying of the authenticity of the caller, rerouting the call to the first communication pathway.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
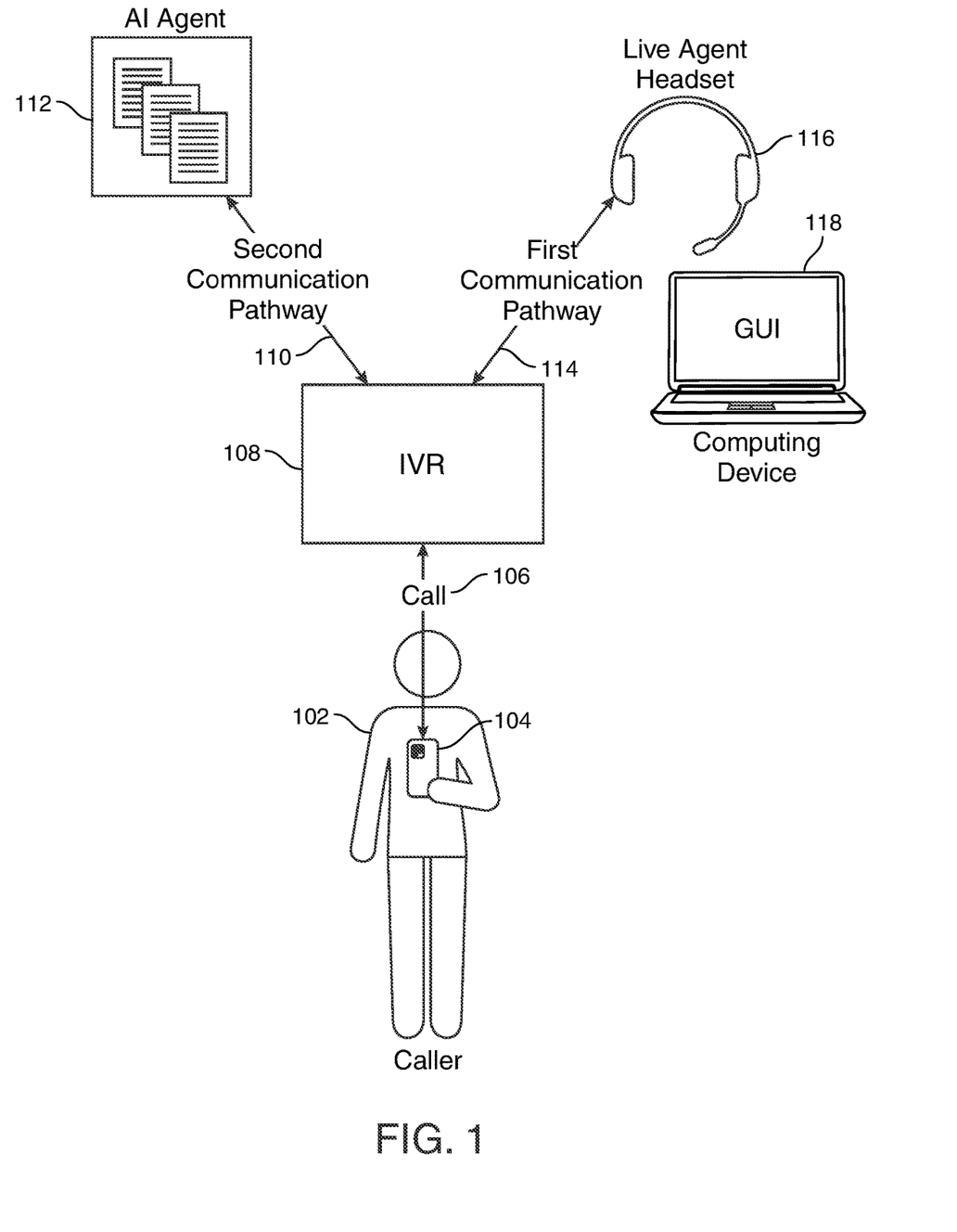
FIG. 1 shows an illustrative diagram in accordance with principles of the disclosure.

FIG. 1 shows an illustrative diagram of an interactive voice response system architecture in accordance with principles of the disclosure.

Mobile device 106 may be in electronic communication with IVR system 108. Mobile device 106 may be associated with caller 102. Caller 102 may initiate a call 104. Call 104 may link mobile device 106 with IVR system 108.

IVR system 108 may leverage a live agent and an automated agent for assistance in responding to call 104. IVR system 108 may communicate with the live agent headset device via a first communication pathway 114. IVR system 108 may communicate with automated agent 112 via a second communication pathway 110.

Automated agent 112 may be an AI model that may be trained with a plurality of datasets for authenticating customers and providing information to customers calling into the IVR system 108. Automated agent 112 may execute machine learning algorithms for voice recognition, voice-to-text transcription, Live agent headset device 116 may be used by the live agent for electronically communicating with caller 102. Live agent headset device 116 may electronically communicate with computing device 118. Computing device 118 may display a GUI of activity occurring during the call 106.

Computing device 118 may display activity on the GUI to the live agent while the call is in electronic communication via the first communication pathway 114 and when in electronic communication via the second communication pathway 110. Live agent headset device 116 may be enabled to interact with the GUI while the call is in electronic communication with the IVR system 108 via the second communication pathways 110.

Figure 2A:
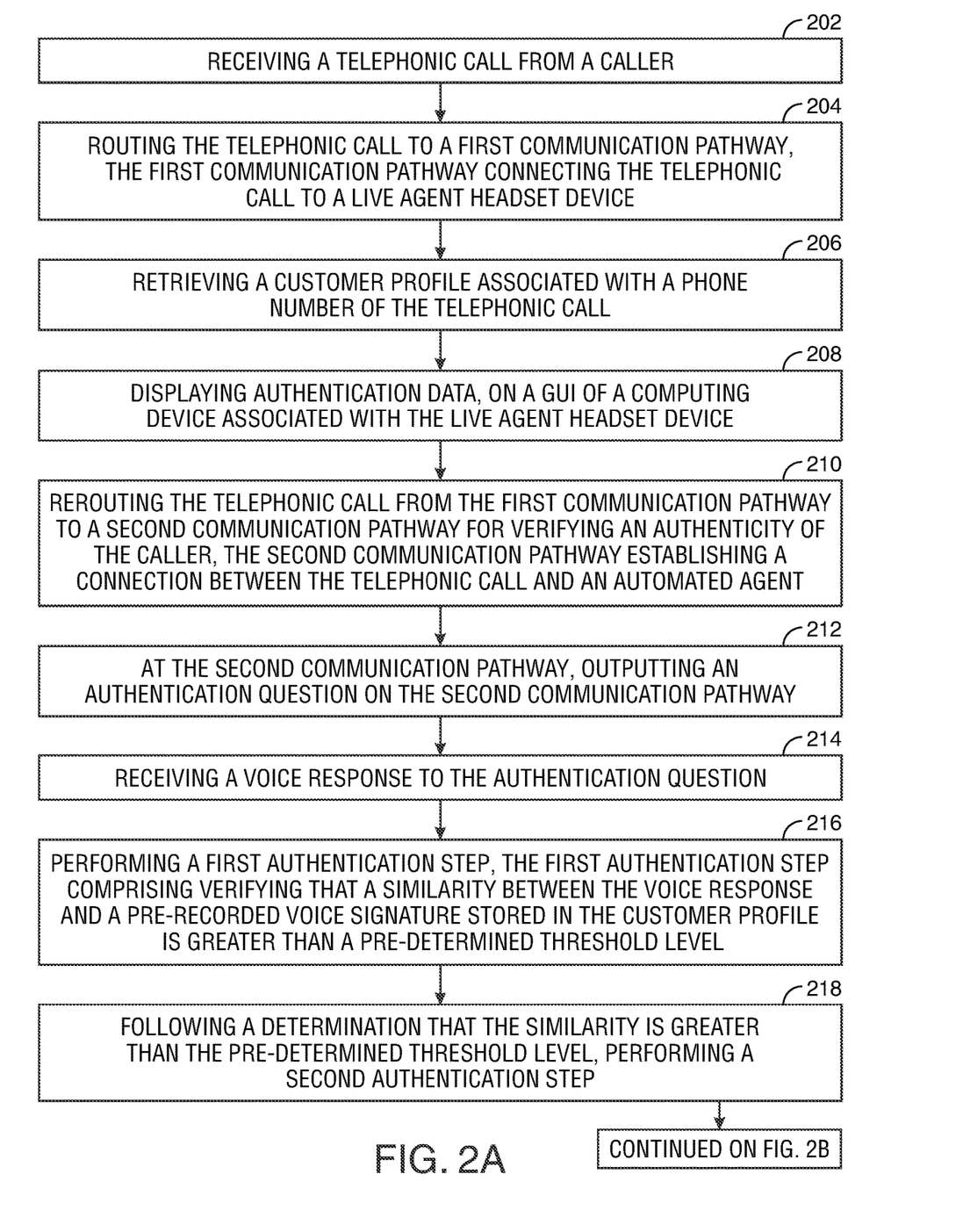
FIG. 2A shows an illustrative flow chart in accordance with principles of the disclosure.
Figure 2B:
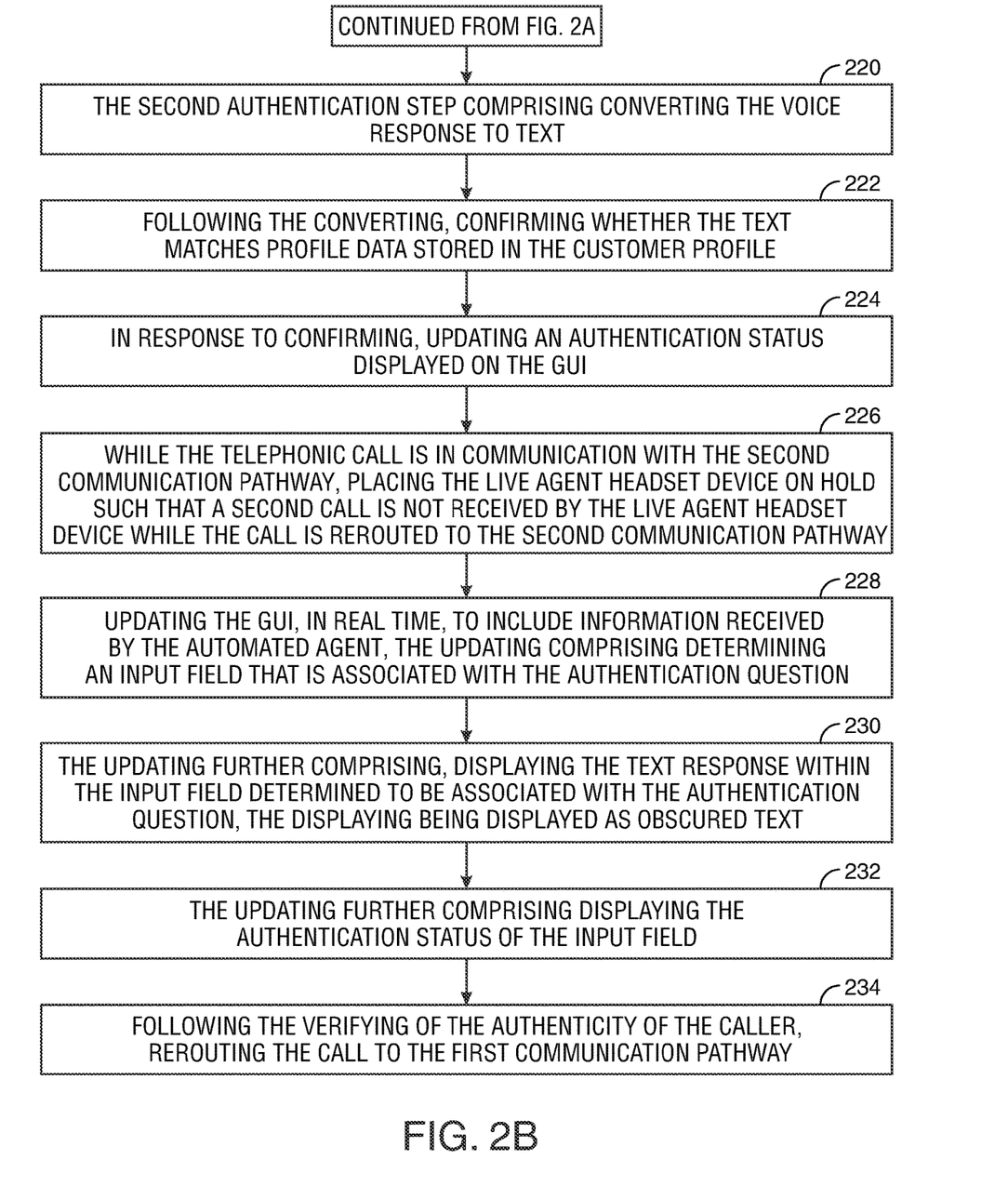
FIG. 2B shows an illustrative flow chart in accordance with principles of the disclosure.

FIG. 2A and FIG. 2B show an illustrative flow chart in accordance with principles of the disclosure. The illustrative flow chart may display a method for authenticating a telephonic call.

FIG. 2A may include method steps 202-218. At step 202, the method step may include receiving a telephonic call from a caller. At step 204 the method step may include routing the telephonic call to a first communication pathway. It should be appreciated that the first communication pathway may connect the telephonic call to a live agent headset device.

At step 206, the method may include retrieving a customer profile associated with a phone number of the telephonic call.

At step 208, the method may include displaying authentication data on a GUI of a computing device associated with the live agent headset device.

At step 210 the method may include rerouting the telephonic call from the first communication pathway to a second communication pathway. The rerouting to enable verifying an authenticity of the caller.

At step 212, the method may include outputting an authentication question on the second communication pathway for verifying the authenticity of the caller.

At step 214, the method may include receiving a voice response to the authentication question.

At step 216, the method may include performing a first authentication step for verifying the voice response. The first authentication step may include verifying that the voice response matches a pre-recorded voice signature of the user associated with the customer profile. The verifying may include verifying that a similarity between the voice response and the pre-recorded voice signature stored in the customer profile is greater than a pre-determined threshold level.

At step 218, the method may include following a determination that the similarity is greater than the pre-determined threshold level, performing a second authentication step.

FIG. 2B shows method steps 220-236. At step 220, the method step may include performing the second authentication step of converting the voice response to text and further verifying the accuracy of the text.

At step 222, the method may include confirming whether the text matches profile data stored in the customer profile.

At step 224, the method may include confirming whether the text matches profile data stored in the customer profile.

At step 226, in response to confirming, the method step may include updating an authentication status displayed on the GUI.

At step 228, the method may include, while the telephonic call is in communication with the second communication pathway, placing the live agent headset device on hold. This may enable that a second call is not received by the live agent headset device while the call is rerouted to the second communication pathway.

At step 230, the method may include updating the GUI in real time to include information received by the automated agent. The updating may include determining an input field that may be associated with the authentication question.

At step 232, the method may include further updating the GUI by displaying the text response within the input field determined to be associated with the authentication question. The text may be displayed as obscured text. This may further protect the secure data being shared by the caller.

At step 234, the method may include further displaying the authentication status of the input field.

At step 236, the method step may include following the verifying of the authenticity of the caller, rerouting the call to the first communication pathway.

Figure 3:
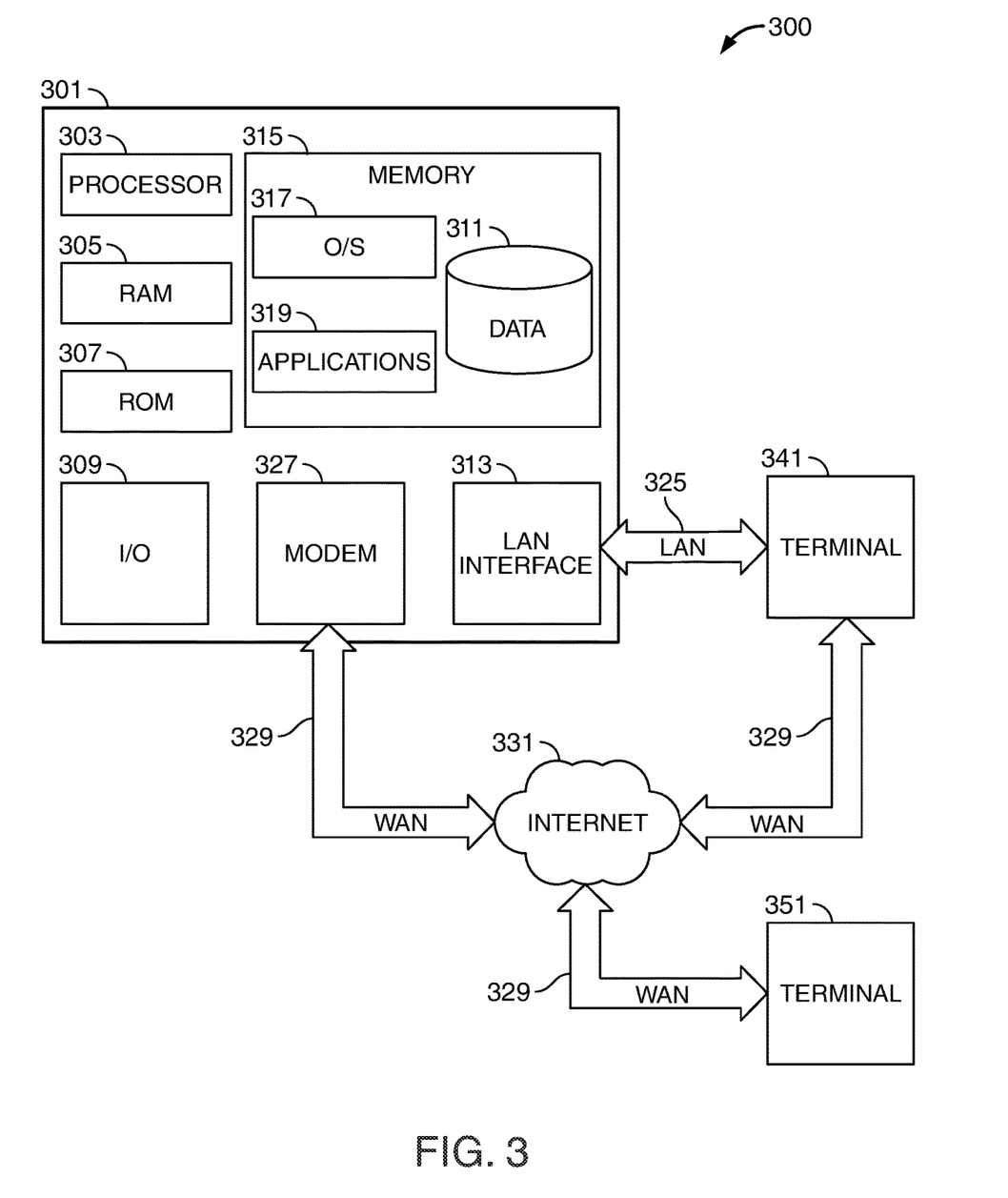
FIG. 3 shows an illustrative block diagram in accordance with principles of the disclosure.

FIG. 3 shows an illustrative block diagram of system 300 that includes computer 301. Computer 301 may alternatively be referred to herein as an "engine," "server" or a "computing device." The computing system may include one or more computer servers 301. Computer 301 may be any computing device described herein. Computer 301 may include IVR system 108, AI agent 112, live agent headset device 116, computing device 118, mobile device 106 and any other computing device described herein. Computer 301 may include the communications server. Elements of system 300, including computer 301, may be used to implement various aspects of the systems and methods disclosed herein.

Computer 301 may have a processor 303 for controlling the operation of the device and its associated components, and may include RAM 305, ROM 307, input/output circuit 309, and a non-transitory or non-volatile memory 315. Machine-readable memory may be configured to store information in machine-readable data structures. Other components commonly used for computers, such as EEPROM or Flash memory or any other suitable components, may also be part of the computer 301.

The memory 315 may be comprised of any suitable permanent storage technology—e.g., a hard drive. The memory 315 may store software including the operating system 317 and application(s) 319 along with any data 311 needed for the operation of computer 301. Memory 315 may also store videos, text, and/or audio assistance files. The data stored in Memory 315 may also be stored in cache memory, or any other suitable memory. Memory 315 may include ML database stored at the smart device.

Input/output ("I/O") module 309 may include connectivity to a microphone, keyboard, touch screen, mouse, and/or stylus through which input may be provided into computer 301. The input may include input relating to cursor movement. The input/output module may also include one or more speakers for providing audio output and a video display device for providing textual, audio, audiovisual, and/or graphical output. The input and output may be related to computer application functionality.

Computer 301 may be connected to other systems via a local area network (LAN) interface 313. Computer 301 may operate in a networked environment supporting connections to one or more remote computers, such as terminals 341 and 351. Terminals 341 and 351 may be personal computers or servers that include many or all of the elements described above relative to computer 301.

When used in a LAN networking environment, computer 301 is connected to LAN 325 through a LAN interface 313 or an adapter. When used in a WAN networking environment, computer 301 may include an environment 327 or other means for establishing communications over WAN 329, such as Internet 331.

In some embodiments, computer 301 may be connected to one or more other systems via a short-range communication network (not shown). In these embodiments, computer 301 may communicate with one or more other terminals 341 and 351, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 319, which may be used by computer 301, may include computer executable instructions for invoking functionality related to communication, such as e-mail, Short Message Service (SMS), and voice input and speech recognition applications. Application program(s) 319 (which may be alternatively referred to herein as "plugins," "applications," or "apps") may include computer executable instructions for invoking functionality related to performing various tasks. Application programs 319 may utilize one or more algorithms that process received executable instructions, perform power management routines or other suitable tasks. Application programs 319 may include any one or more of the applications, instructions and algorithms associated with and/or embedded within the applications described herein.

Application program(s) 319 may include computer executable instructions (alternatively referred to as "programs"). The computer executable instructions may be embodied in hardware or firmware (not shown). The computer 301 may execute the instructions embodied by the application program(s) 319 to perform various functions.

Application program(s) 319 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 319 may include one or more algorithms that may be used to implement features of the disclosure.

The invention may be described in the context of computer-executable instructions, such as applications 319, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 301 and/or terminals 341 and 351 may also include various other components, such as a battery, speaker, and/or antennas (not shown). Components of computer system 301 may be linked by a system bus, wirelessly or by other suitable interconnections. Components of computer system 301 may be present on one or more circuit boards. In some embodiments, the components may be integrated into a single chip. The chip may be silicon-based.

Terminal 351 and/or terminal 341 may be portable devices such as a laptop, cell phone, Blackberry™, tablet, smartphone, or any other computing system for receiving, storing, transmitting and/or displaying relevant information. Terminal 351 and/or terminal 341 may be one or more user devices. Terminals 351 and 341 may be identical to computer 301 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 4:
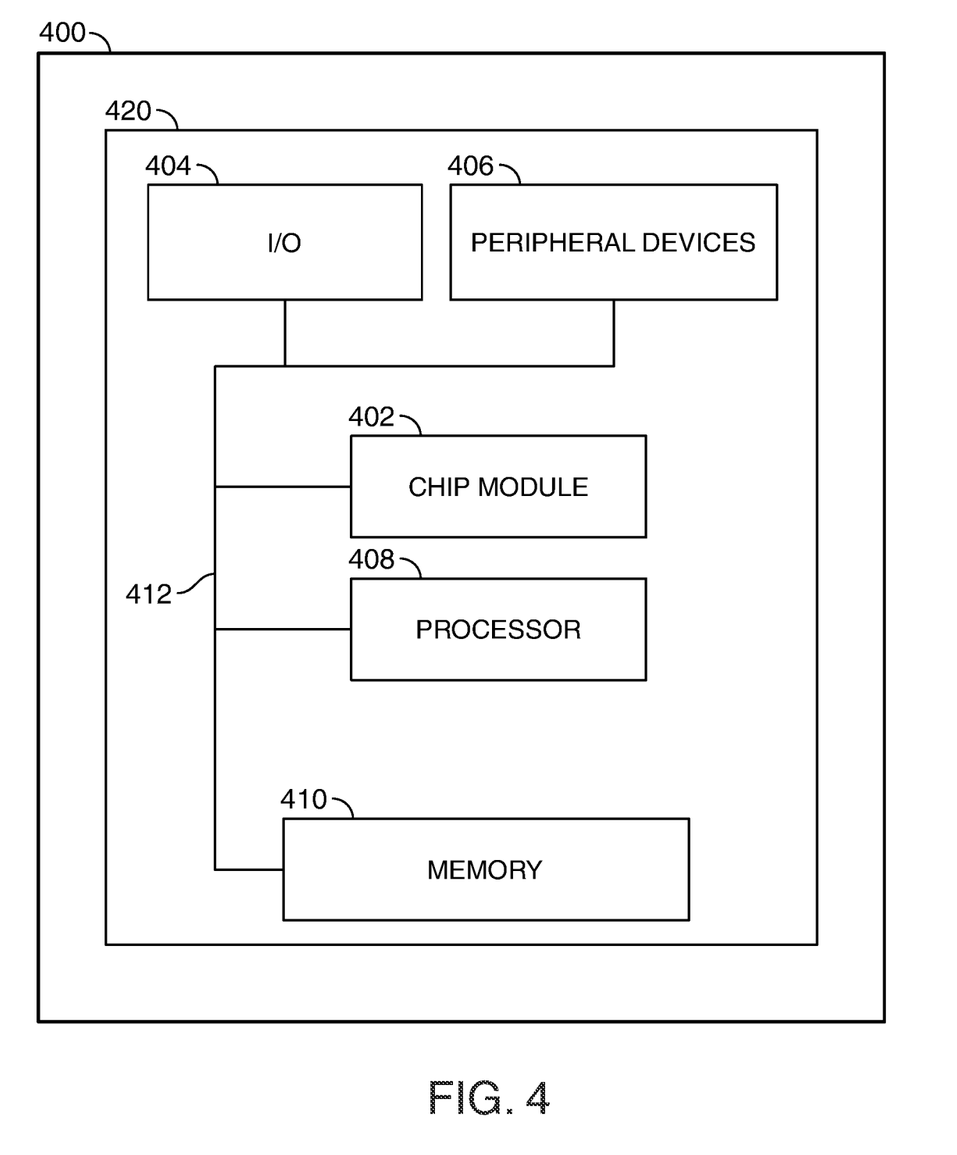
FIG. 4 shows an illustrative apparatus that may be configured in accordance with principles of the disclosure.

FIG. 4 shows illustrative apparatus 400 that may be configured in accordance with the principles of the disclosure. Apparatus 400 may be a computing device. Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data, and machine-readable memory 410.

Machine-readable memory 410 may be configured to store in machine-readable data structures: machine executable instructions, (which may be alternatively referred to herein as "computer instructions" or "computer code"), applications such as applications 419, signals, and/or any other suitable information or data structures.

Components 402, 404, 406, 408 and 410 may be coupled together by a system bus or other interconnections 412 and may be present on one or more circuit boards such as circuit board 420. In some embodiments, the components may be integrated into a single chip. The chip may be silicon-based.

Thus, systems and methods for automatically rerouting telephonic calls between a live agent and an automated agent is provided. Persons skilled in the art will appreciate that the present invention can be practiced by other than the described embodiments, which are presented for purposes of illustration rather than of limitation.

What is claimed is:

1. A method for automatically rerouting telephonic calls between a live agent and an automated agent, the method comprising:
   receiving a telephonic call from a caller;
   routing the telephonic call to a first communication pathway, the first communication pathway connecting the telephonic call to a live agent headset device;
   retrieving a customer profile associated with a phone number of the telephonic call;
   displaying authentication data, on a graphical user interface ("GUI") of a computing device associated with the live agent headset device, the authentication data comprising:
   the customer profile; and
   input fields for receiving authentication information;
   rerouting the telephonic call from the first communication pathway to a second communication pathway for verifying an authenticity of the caller, the second communication pathway establishing a connection between the telephonic call and the automated agent, wherein the automated agent verifies the authenticity of the caller by:
   outputting an authentication question on the second communication pathway;
   receiving a voice response to the authentication question;

performing a first authentication step, the first authentication step comprising verifying that a similarity between the voice response and a pre-recorded voice signature stored in the customer profile is greater than a pre-determined threshold level; and following a determination that the similarity is greater than the pre-determined threshold level, performing a second authentication step comprising:
converting the voice response to text;
confirming whether the text matches profile data stored in the customer profile; and
in response to confirming, updating an authentication status displayed on the GUI;

while the telephonic call is in communication with the second communication pathway:
placing the live agent headset device on hold such that a second call is not received by the live agent headset device while the call is rerouted to the second communication pathway; and
updating the GUI, in real time, to include information received by the automated agent, the updating comprising:
determining an input field that is associated with the authentication question;
displaying the text within the input field determined to be associated with the authentication question, the displaying being displayed as obscured text; and
displaying the authentication status of the input field; and following the verifying of the authenticity of the caller, rerouting the call to the first communication pathway.

2. The method of claim 1 wherein the GUI further comprises a window within the GUI configured for displaying information identified from the telephonic call, via artificial intelligence ("AI") as being pertinent to a one or more services the telephonic call may be associated with.

3. The method of claim 2 further comprising, outputting within the window, in combination with the information displayed, direct links to the one or more services.

4. The method of claim 1 wherein when the authentication question is outputted to the caller the method further comprises displaying the authentication question on the GUI.

5. The method of claim 1 further comprising denying the authenticity of the caller when the voice response is less than the pre-determined threshold level.

6. The method of claim 5 further comprising, following the denying, flagging the customer profile on the GUI and rerouting the telephonic call to the first communication pathway.

7. The method of claim 1 further comprising periodically triggering a changing of the pre-recorded voice signature, the periodically triggering comprises, following a lapse of a pre-determined time period, triggering a request for updating the pre-recorded voice signature.

8. The method of claim 1 wherein the pre-determined threshold level of the level of similarity is a 95% accuracy.

9. The method of claim 1 further comprising establishing a window within the GUI configured for receiving one or more requests, in real-time, from the live agent headset device, the one or more requests for requesting additional authentication from the caller.

10. The method of claim 1 wherein during a duration of time that the live agent headset device is placed on hold, the method comprises displaying at the GUI, data associated with the telephonic call and one or more hyperlinks that may be readily accessible via the live agent headset device to provide to the caller when the telephonic call is rerouted to the first communication pathway.

11. A telephonic routing system to enable rerouting a call between a live agent and an automated agent, the telephonic routing system running on a communications server, the telephonic routing system comprising:
a receiver configured to:
receive a telephonic call from a caller; and
extract a phone number of the telephonic call;
a router configured to route the telephonic call to a first communication pathway, the first communication pathway connecting the telephonic call to a live agent headset device;
a processor configured to:
retrieve a customer profile associated with the phone number; and
display authentication data, on a graphical user interface ("GUI") of a computing device associated with the live agent headset device, the authentication data comprising:
the customer profile; and
input fields for receiving authentication information;
the router further configured to reroute the telephonic call from the first communication pathway to a second communication pathway for verifying an authenticity of the caller, the second communication pathway establishing a connection between the telephonic call and the automated agent;
the processor further configured to verify the authenticity of the caller, via the automated agent, by:
outputting an authentication question on the second communication pathway;
receiving a voice response to the authentication question;
performing a first authentication step, the first authentication step comprising verifying that a similarity between the voice response and a pre-recorded voice signature stored in the customer profile is greater than a pre-determined threshold level; and
following a determination that the similarity is greater than the pre-determined threshold level, performing a second authentication step comprising:
converting the voice response to text;
confirming whether the text matches data stored in the customer profile; and
in response to confirming, updating an authentication status displayed on the GUI;
while the call is in communication with the second communication pathway, the processor is configured to:
place the live agent headset device on hold such that a second call is not received by the live agent headset device while the call is rerouted to the second communication pathway; and
update the GUI, in real time, to include information received by the automated agent, the updating comprising:
determining an input field that is associated with the authentication question;
displaying the text within the input field determined to be associated with the authentication question, the displaying being displayed as obscured text;
displaying the authentication status of the input field; and
establishing a window within the GUI configured for receiving one or more requests, in real-time, from the live agent headset device, the one or more requests for requesting additional authentication from the caller; and the router is further configured to, follow the verifying of the authenticity of the caller, reroute the call to the first communication pathway.

12. The system of claim 11 wherein the processor is configured to deny the authenticity of the caller when the voice response is less than the pre-determined threshold level.

13. The system of claim 12 wherein following the denying, the processor is further configured to flag the customer profile on the GUI and reroute the call to the first communication pathway.

14. A method for automatically rerouting telephonic calls between a live agent and an automated agent, the method being performed via a processor on a communications server, the method comprising:

receiving a telephonic call from a caller;

routing the telephonic call to a first communication pathway, the first communication pathway connecting the telephonic call to a live agent headset device;

retrieving a customer profile associated with a phone number of the telephonic call;

displaying authentication data on a graphical user interface ("GUI") of a computing device associated with the live agent headset device, the authentication data comprising:

the customer profile; and input fields for receiving authentication information;

rerouting the telephonic call from the first communication pathway to a second communication pathway for verifying an authenticity of the caller, the second communication pathway establishing a connection between the telephonic call and the automated agent, wherein the automated agent verifies the authenticity of the caller by:

outputting a first authentication question on the second communication pathway;

receiving a first voice response to the first authentication question;

performing a first authentication step, the first authentication step comprising verifying that a similarity between the first voice response and a pre-recorded voice signature stored in the customer profile is greater than a pre-determined threshold level; and following a determination that the similarity is greater than the pre-determined threshold level, performing a second authentication step comprising:

converting the first voice response to text; and confirming whether the text matches profile data stored in the customer profile;

when the text does not match the profile data:

rerouting the telephonic call to the first communication pathway;

transmitting a one-time passcode ("OTP") to a mobile device of the caller;

receiving input, at the live agent headset device, of the OTP;

in response to an authentication of the OTP by the live agent headset device, rerouting the call to the second communication pathway;

outputting a second authentication question at the second communication pathway; and receiving a second voice response to the second authentication question; and when the text does match the profile data, updating an authentication status displayed on the GUI;

while the telephonic call is in communication with the second communication pathway:

placing the live agent headset device on hold such that a second call is not received by the live agent headset device while the call is rerouted to the second communication pathway; and updating the GUI, in real time, to include information received by the automated agent, the updating comprising:

determining an input field that is associated with the first authentication question;

displaying the text within the input field determined to be associated with the first authentication question, the displaying being displayed as obscured text;

displaying the authentication status of the input field; and following the verifying of the authenticity of the caller, rerouting the call to the first communication pathway.

15. The method of claim 14 further comprising, following a receipt of the second voice response, performing the first authentication step for authenticating the second voice response.

16. The method of claim 15 further comprising following a determination that the similarity between the second voice response and the pre-recorded voice signature is greater than the pre-determined threshold level, performing the second authentication step.

17. The method of claim 16 wherein when the similarity between the second voice response and the pre-recorded voice signature is less than the pre-determined threshold level, the method comprises flagging the customer profile and terminating the telephonic call.

18. The method of claim 16 wherein the performing of the second authentication step comprises:

converting the second voice response to text; and confirming that the text matches the profile data stored in the customer profile.

19. The method of claim 14 wherein the GUI further comprises a window within the GUI configured for displaying information identified from the telephonic call, via artificial intelligence ("AI") as being pertinent to one or more services the telephonic call may be associated with.

20. The method of claim 19 further comprising outputting within the window, in combination with the information displayed, direct links to the one or more services.

* * * * *